(12) United States Patent
Dausoa et al.

(10) Patent No.: US 11,541,913 B2
(45) Date of Patent: Jan. 3, 2023

(54) VEHICLE HEIGHT CONTROL METHOD AND ASSOCIATED VEHICLE

(71) Applicant: ALSTOM Transport Technologies, Saint-Ouen (FR)

(72) Inventors: Sacheen Dausoa, Le Creusot (FR); Eric Bonin, Jardin (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 449 days.

(21) Appl. No.: 16/535,633

(22) Filed: Aug. 8, 2019

(65) Prior Publication Data
US 2020/0047774 A1    Feb. 13, 2020

(51) Int. Cl.
| | | |
|---|---|---|
| B61D 3/04 | (2006.01) | |
| B61D 1/00 | (2006.01) | |
| B61F 5/22 | (2006.01) | |
| B61F 5/02 | (2006.01) | |
| B60G 17/019 | (2006.01) | |

(52) U.S. Cl.
CPC ............. *B61D 1/00* (2013.01); *B60G 17/019* (2013.01); *B61F 5/02* (2013.01); *B61F 5/22* (2013.01); *B61D 3/04* (2013.01)

(58) Field of Classification Search
CPC . B61D 1/00; B61D 3/04; B61D 47/00; B61D 7/005; B61F 5/22; B61F 5/02; B61F 5/04; B61F 5/24; B61F 5/00; B61F 5/14; B60G 17/00; B60G 17/015; B60G 17/019; B60G 17/01941; B60G 17/017; B60G 2500/30
See application file for complete search history.

(56) References Cited

U.S. PATENT DOCUMENTS

| | | | | |
|---|---|---|---|---|
| 3,765,692 | A * | 10/1973 | Barber | B64F 1/32 |
| | | | | 280/5.503 |
| 6,637,348 | B1 * | 10/2003 | Teichmann | B60G 17/0272 |
| | | | | 105/199.1 |
| 7,185,592 | B2 * | 3/2007 | Hommen | B60G 17/0272 |
| | | | | 105/453 |
| 10,507,848 | B2 * | 12/2019 | Demarquilly | B61D 23/025 |

(Continued)

FOREIGN PATENT DOCUMENTS

| | | | | |
|---|---|---|---|---|
| EP | 1787613 A2 * | 5/2007 | | A61G 3/065 |
| FR | 3053301 A1 | 1/2018 | | |

(Continued)

OTHER PUBLICATIONS

French Search Report for French Application No. 1857406, dated May 16, 2019 in 2 pages.

*Primary Examiner* — S. Joseph Morano
*Assistant Examiner* — Cheng Lin
(74) *Attorney, Agent, or Firm* — Knobbe, Martens, Olson & Bear, LLP

(57) ABSTRACT

A method controls the height of a floor of a car of a vehicle relative to a platform. The car includes a body provided with a distance sensor, at least one bogie and at least one secondary suspension between the bogie and the body. The method includes measuring the distance between the distance sensor and the platform via the distance sensor, calculating the difference between the height of the platform and the height of the floor from the measured distance, and adjusting the height of the secondary suspension based on the difference.

13 Claims, 3 Drawing Sheets

(56) References Cited

U.S. PATENT DOCUMENTS

2017/0174231 A1* 6/2017 Bochud .................... B61F 5/22
2018/0001914 A1* 1/2018 Dausoa .................... B61F 5/02

FOREIGN PATENT DOCUMENTS

| JP | H05116627 A | 5/1993 |
| JP | 2006-027477 A | 2/2006 |
| WO | 2010/142657 A1 | 12/2010 |

* cited by examiner

VEHICLE HEIGHT CONTROL METHOD AND ASSOCIATED VEHICLE

CROSS-REFERENCE TO RELATED APPLICATION

This application claims priority to French Patent Application No. 18 57406 filed on Aug. 9, 2018, the disclosure of which including the specification, the drawings, and the claims, is hereby incorporated by reference in its entirety.

FIELD OF THE INVENTION

The present invention relates to a method for controlling the height of a floor of a car of a vehicle relative to a platform, the car comprising a body comprising the floor, at least one bogie and at least one secondary suspension inserted between the bogie and the body.

BACKGROUND OF THE INVENTION

In the passenger transport sector, more particularly rail transport, a vehicle is called upon to make several stops in stations, or train stations, to allow travelers and/or objects to exit or enter.

Access by travelers and/or objects to a car is done at the floor of the car, which is generally positioned opposite the platform of the station.

However, the height difference that may exist between the floor and the platform can prove unacceptable for certain users, in particular those with reduced mobility. In particular, the ADA (American Disability Act) standard requires a height difference between the platform and the floor of less than 16 millimeters (mm).

The height difference can further make it difficult to transfer bulky and/or heavy objects from the platform to the body and vice versa.

The height of the floor then needs to be adapted to the platform height(s). However, the height of the platform may vary from one station to another. Furthermore, the height of the access floor is subject to significant variations, under the effect of various parameters. These in particular include the value of the load of the car in particular corresponding to the mass of the passengers and baggage occupying the car, the distribution of this load, or the wear of the wheels. Thus, a solution not taking these parameters into account does not make it possible to comply with the ADA standard.

Document FR 3,053,301 proposes a method for controlling the height of the floor relative to a platform in particular making it possible to satisfy the ADA standard, in which the height of the secondary suspension is adjusted to adapt the height of the floor. The adjustment of the height of the secondary suspension is done based on the estimate of the height of the apex of the bogie chassis, this estimate essentially depending on internal parameters of the vehicle.

However, said internal parameters may evolve over the course of the use of the rail vehicle, such that they no longer correspond to the initial configuration. An adjustment of the parameters, for example by measurement over the course of maintenance operations or owing to estimates, is done, which makes the method complex and/or may make said maintenance operations longer.

SUMMARY OF THE INVENTION

One aim of the invention is therefore to propose a method making it possible to modify the height of a transport vehicle simply, in particular to ensure easy access for users of this vehicle.

To that end, the invention relates to a control method of the aforementioned type, wherein the body being provided with a distance sensor, the sensor being able to measure a distance between said sensor and a platform when the vehicle is parked near said platform, the method comprising the following steps:
measuring the distance between the distance sensor and the platform via the distance sensor,
calculating the difference between the height of the platform and the height of the floor from the distance measured between the distance sensor and the platform, the height of the platform and the height of the floor being taken relative to a same reference point, and
adjusting the height of the secondary suspension, based on the difference.

The presence of the distance sensor makes it possible to readjust the calculation of the difference to the outside environment measured directly. The adjustment made to the secondary suspension is thus as close as possible to reality. Thus, the height between the platform and the floor is minimized. The height between the platform and the floor is less than 16 mm, as set out by the ADA standard, and more particularly less than 5 mm.

According to specific embodiments of the invention, the method comprises one or several of the following features according to any technically possible combination:

the distance sensor is positioned to be above the platform in an elevation direction of the platform irrespective of the height of the secondary suspension, and is preferably a laser, ultrasound or optical sensor, the adjustment of the height of the secondary suspension is calculated so that the height of the floor is substantially equal to the height of the platform, the vehicle comprises a processor able to calculate the difference between the height of the platform and the height of the floor from the measured distance, the processor activating an actuating device of a device for controlling the height of the secondary suspension, the secondary suspension comprises at least one cushion and in that the device for controlling the height of the secondary suspension comprises at least one solenoid valve connected to the actuating device able to be activated by the processor, the solenoid valve being able to introduce fluid into the cushion and/or to expel fluid from the cushion, the method comprises the following steps:
additional modification of the height of the floor relative to the adjusting step,
calculating the additional modification from at least one additional measurement, the additional measurement being different from the measurement of the distance between the distance sensor and the platform, and
additional adjustment of the height of the secondary suspension to compensate the additional modification, the additional measurement is done by a sensor for measuring the height of the secondary suspension and/or by a sensor for measuring the variation of the height of the secondary suspension and/or by a load sensor of the body, the steps for additional modification, calculation of the additional modification and additional adjustment are carried out when the distance sensor capable of measuring the distance between said sensor and the platform is incapable of measuring said distance, the steps for measuring the distance between the distance sensor and the platform via the distance sensor, calculating the difference between the height of the platform and the height of the floor and adjusting the height of the secondary suspension are carried out when the vehicle enters the platform and wherein the steps for additional modification, calculation of the additional modification and additional adjustment are carried out when the vehicle parks at the platform.

The invention further relates to a vehicle comprising at least one car comprising a body comprising a floor, at least one bogie and at least one secondary suspension inserted between the bogie and the body, the body being provided with a distance sensor, the distance sensor being able to measure a distance between said distance sensor and a platform when the vehicle is parked near the platform, the vehicle being able to command the height of the floor relative to the platform according to a control method of the aforementioned type.

BRIEF DESCRIPTION OF THE DRAWINGS

The invention will be better understood upon reading the following description, provided as an example, and in reference to the appended drawings, in which.

DETAILED DESCRIPTION OF THE PREFERRED EMBODIMENTS

In the present description, the terms "vertical" and "horizontal" are defined relative to a rail vehicle. Thus, a horizontal plane is substantially parallel to the rolling plane of the vehicle, and the vertical or elevation direction is substantially perpendicular to the rolling plane. Furthermore, the terms "high", referenced H, and "low", referenced B, are defined conventionally along in the vertical direction.

The term "longitudinal" is defined relative to the direction in which a railway vehicle extends and corresponding to the direction of travel of the railway vehicle, and the term "transverse" is defined as a direction substantially perpendicular to the longitudinal direction and the vertical direction.

The figures show a coordinate system, in which a longitudinal direction is designated by reference X, the transverse direction is designated by reference Y, and the elevation direction is designated by reference Z.

Figure 1:
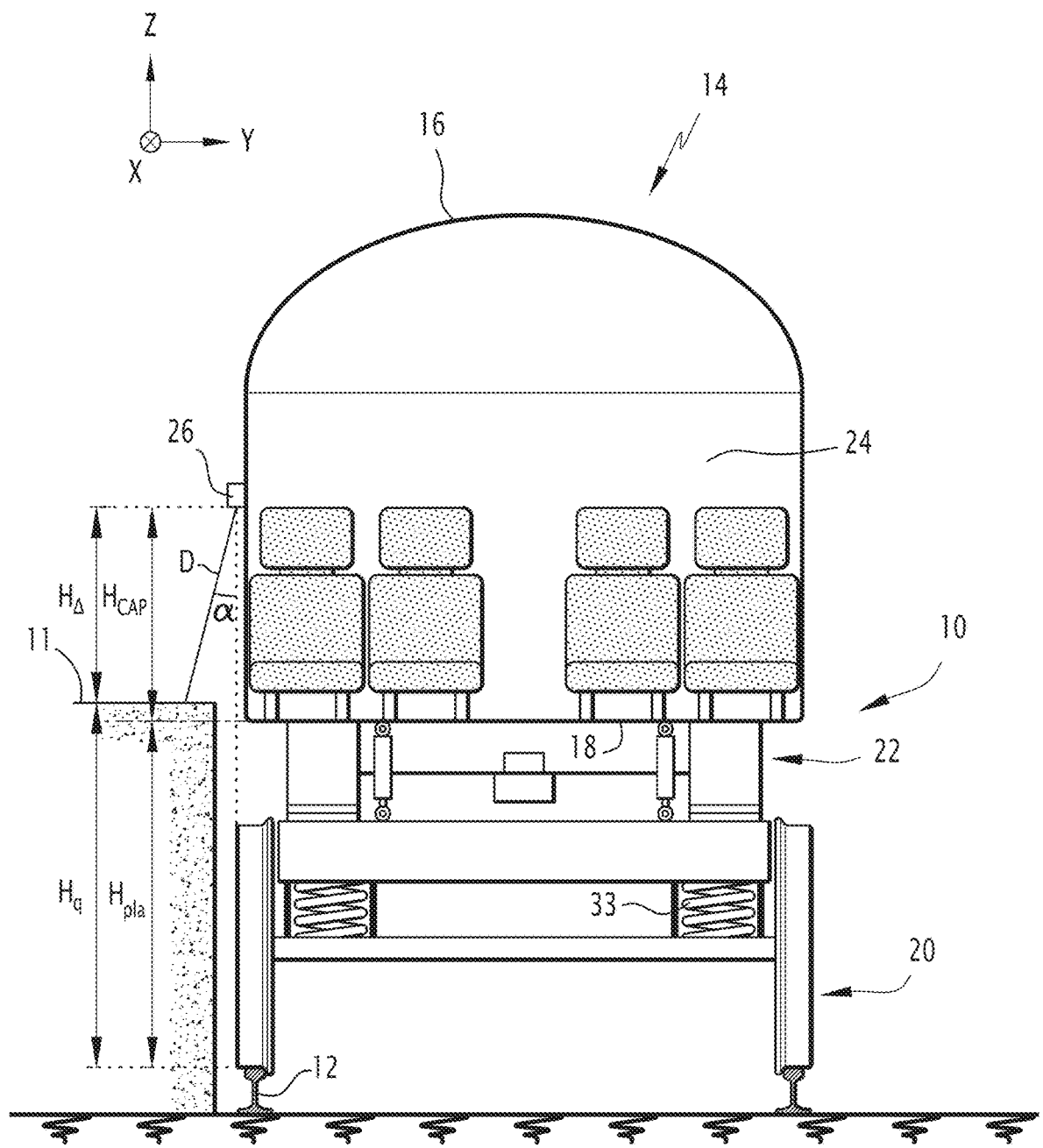
FIG. 1 is a simplified sectional view of a vehicle car on rails near a platform according to a first embodiment of the invention.
Figure 2:
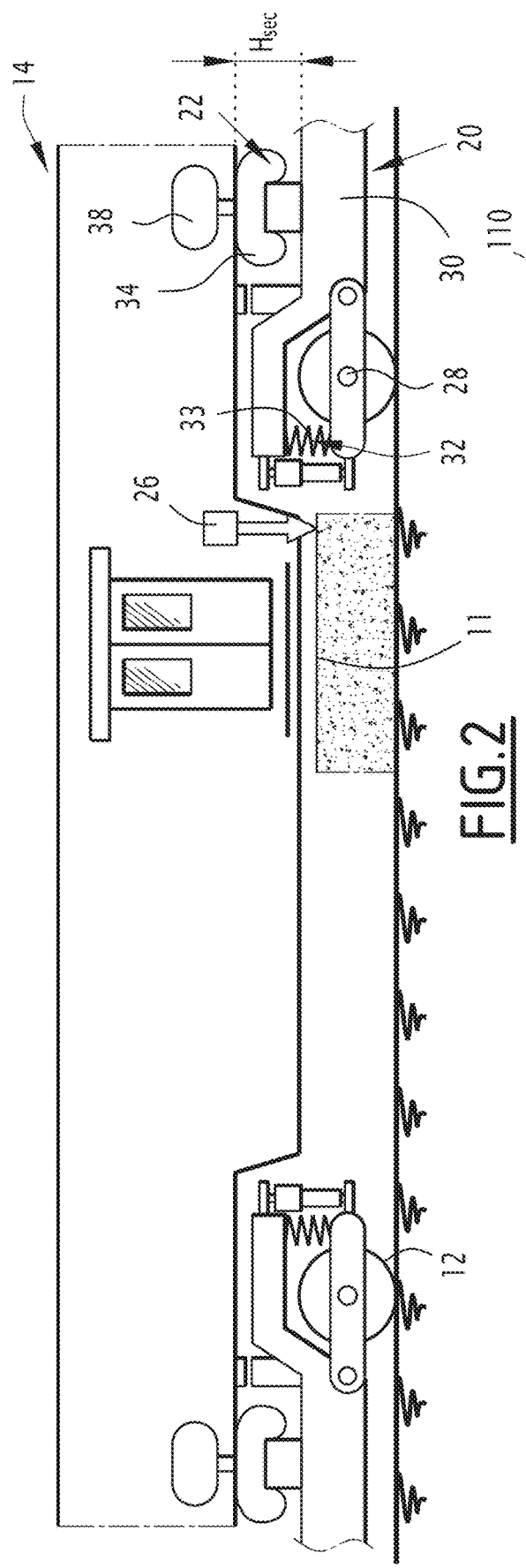
FIG. 2 is a simplified side view of the car, the rails and partially of the platform of FIG. 1.
Figure 3:
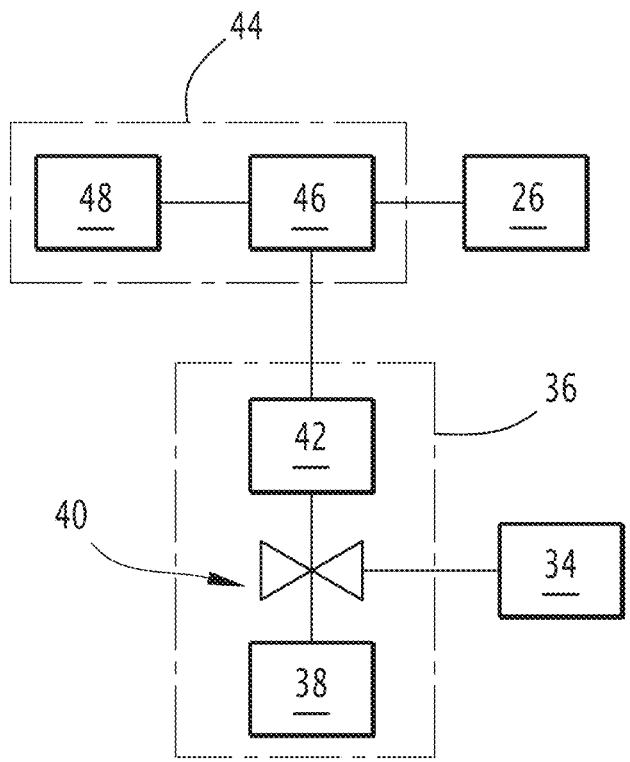
FIG. 3 is a schematic view of elements of the vehicle relative to the control method according to a first embodiment of the invention.

A vehicle 10 according to a first embodiment of the invention is shown in FIGS. 1 to 3.

The vehicle 10 is for example a bus or a rail vehicle moving on rails 12 such as a trolleybus, tram, subway or train.

The vehicle is capable of traveling and stopping at a station including a platform 11 extending at a certain distance from the rolling plane of the vehicle.

Here, depending on the context the height refers either to the size of an object in the elevation direction Z, or the distance in the elevation direction Z between an element and a reference level. In the illustrated example, the reference level corresponds to the apex of the rails. However, in particular in the case of a vehicle not moving on rails, the reference level can be another reference, for example the level of the road. In other words, the reference level corresponds to the rolling plane of the rail vehicle.

The vehicle 10 comprises at least one car 14. In a known manner, each car 14 comprises a body 16, at least one bogie 20 and at least one secondary suspension 22 inserted between the bogie 20 and the body 16.

More specifically, the vehicle 10 comprises a plurality of cars 14 and a plurality of bogies 20, each body 16 resting on at least two bogies 20. Outside the ends of the vehicle, each bogie 20 extends, for example, between two adjacent bodies, each of the two bodies resting partially on the bogie.

The body 16 comprises an inner space 24 able to accommodate people and/or goods. The body 16 has a floor 18, the floor 18 allowing access by people and/or goods to the inner space 24.

The height of the floor $H_{pla}$ will refer to the distance in the elevation direction Z between the floor 18 and the reference level.

The body 16 is provided with a distance sensor 26.

The height of the sensor $H_{cap}$ will refer to the distance in the elevation direction Z between the sensor 26 and the floor 18. This is a determined value related to the layout of the vehicle.

The distance sensor 26 is able to measure a distance D between said sensor 26 and a platform 11 when the vehicle 10 is parked near said platform 11.

The height of the platform $H_q$ will refer to the distance in the elevation direction Z between the surface of the platform 11 on which the passengers move and the reference level.

The distance sensor 26 is able to measure the distance to the first obstacle in a measuring direction, the measuring direction being chosen such that, when the vehicle is parked near a platform, when there is no intermediate obstacle, the distance sensor 26 measures the distance between the sensor and said surface of the platform 11.

The distance sensor 26 here has a beam in the measuring direction making it possible to take the measurement in said measuring direction. The distance sensor 26 is, for example, a laser, ultrasound or optical sensor.

The sensor is positioned such that it is at the height of the secondary suspension, the height of the sensor relative to the apex of the rails is greater than the height of the platform with respect to the apex of the rails. The height of the sensor with respect to the apex of the rails is for example greater than 1 meter.

In other words, the distance sensor 26 is positioned to be above the platform in an elevation direction of the platform irrespective of the height of the secondary suspension.

Thus, the distance D primarily has a vertical component.

The distance sensor 26 has a precision of 2 mm.

The measuring direction along which the beam of the distance sensor 26 extends for example forms an angle α with the elevation direction Z, the angle α being between 8° and 15°, as shown in FIG. 1.

The difference in elevation along the elevation direction between the sensor 26 and the surface of the platform 11 referenced $H_A$ in FIG. 1 is such that the cosine of α is equal to said difference divided by the distance D, or $\cos \alpha = H_A/D$.

The angle α being fixed, it is therefore possible to calculate the difference $H_A$ from the measurement of the distance D, using the formula $H_A = D \times \cos \alpha$.

The difference between the height of the platform $H_q$ and the height of the floor $H_{pla}$ is equal to the difference between the height of the sensor $H_{cap}$ and the difference in elevation $H_A$, or $H_q - H_{pla} = H_{cap} - H_A$ or $H_q - H_{pla} = H_{cap} - D \times \cos \alpha$. If the floor is lower than the platform, this difference is negative. If the floor is higher than the platform, this difference is positive.

The bogie 20 comprises at least one axle 28, more particularly two axles, a bogie chassis 30 and at least one primary suspension 32 inserted between each axle 28 and the bogie chassis 30.

The primary suspension 32 has a stiffness K. More particularly here, the primary suspension comprises at least one spring 33 extending between the axle 28 and the bogie chassis 30 substantially along the elevation direction. Several springs can be provided, in which case the springs are placed parallel to one another. Each spring 33 has a stiffness substantially equal to K divided by the number of springs.

The secondary suspension 22 more particularly extends between the bogie chassis 30 and the body 14.

When the bogie 20 is at the interface between two bodies 14, the vehicle comprises at least one first secondary suspension between the bogie 20 and the first body and at least one second secondary suspension between the bogie 20 and the second body.

The secondary suspension 22 for example includes at least one suspension system 34 and a control device 36 for controlling the height of the secondary suspension 22. The height $H_{sec}$ of the secondary suspension 22 here is the distance along the elevation direction of the secondary suspension 22 between the body 14 and the bogie 20, shown in FIG. 2.

The suspension system 34 is for example a pneumatic cushion.

In this case, the control device 36 for controlling the height of the secondary suspension comprises a reservoir 38 connected to the pneumatic cushion 34, a solenoid valve 40 between the reservoir 38 and the cushion 34 and an actuating device 42.

The reservoir 38 is a fluid reservoir, more particularly for compressed air.

The solenoid valve 40 is able to introduce fluid from the reservoir 38 into the cushion 34 and/or to expel fluid from the cushion 34. More particularly, the solenoid valve 40 has at least three positions: at least one introduction position, at least one expulsion position and at least one maintaining position.

When the solenoid valve is in the introduction position, fluid is introduced from the reservoir 38 into the cushion 34.

The solenoid valve 40 here has a plurality of introduction positions here corresponding to all of the positions between the maintenance position and a maximum introduction position corresponding to a maximum fluid flow rate introduced into the cushion 34.

When the solenoid valve is in the expulsion position, fluid is expelled into the cushion 34.

The solenoid valve 40 here has a plurality of expulsion positions here corresponding to all of the positions between the maintenance position and a maximum expulsion position corresponding to a maximum fluid flow rate expelled from the cushion 34.

When the solenoid valve is in the maintenance position, it does not allow fluid to circulate.

The actuating device 42 is connected to the solenoid valve 40 and is capable of actuating the solenoid valve, more specifically, of moving the solenoid valve 40 among the plurality of positions.

Alternatively, the introduction of fluid into the cushion and the expulsion of fluid from the cushion are done by two different solenoid valves actuated either by the same actuating device, or by two separate actuating devices.

Alternatively, the secondary suspension 22 is done by another system, for example, a jack controlled by a controller.

The vehicle 10 further comprises a processing unit 44 comprising a processor 46 and a memory 48.

The processor 46 is capable of performing calculations, receiving the distance measurements from the sensor 26, executing a program stored in the memory 48 and controlling the actuating device 42.

The program stored in the memory 48 comprises an algorithm making it possible to calculate the difference between the height of the platform $H_q$ and the height of the floor $H_{pla}$ from the distance D, for example, by performing the following calculation: $H_{cap} - D \times \cos \alpha$.

The height of the floor relative to the platform of such a vehicle is able to be controlled according to a control method as described hereinafter.

The method comprises the following successive steps:

measuring the distance D between the sensor 26 and the platform 11 via the sensor 26, calculating the difference between the height of the platform $H_q$ and the height of the floor $H_{pla}$ from the distance D measured between the sensor 26 and the platform 11, and adjusting the height of the secondary suspension $H_{sec}$, based on the difference.

More specifically, the measurement of the distance D is sent to the processor 46, which executes the program stored in the memory 48.

The processor 46 thus calculates the difference between the height of the platform and the height of the floor $H_{pla}$.

When this difference is nil, the height of the secondary suspension $H_{sec}$ is kept constant.

When this difference is positive, i.e., the floor 18 is lower than the platform 11, the processor 46 controls the actuating device 42 in order to increase the height of the secondary suspension $H_{sec}$. Here, the processor 46 activates the actuating device 42, which moves the solenoid valve 40 into an introduction position so as to introduce fluid into the cushion 34. The volume of the cushion 34, and thus the height of the secondary suspension $H_{sec}$, therefore the height $H_{pla}$ of the floor 18, increase.

When this difference is negative, i.e., the floor 18 is higher than the platform 11, the processor 46 controls the actuating device 42 in order to decrease the height of the secondary suspension $H_{sec}$. Here, the processor 46 activates the actuating device 42, which moves the solenoid valve 40 into an expulsion position so as to expel fluid from the cushion 34. The volume of the cushion 34, and thus the height of the secondary suspension $H_{sec}$, therefore the height $H_{pla}$ of the floor 18, decrease.

The adjustment of the height of the secondary suspension $H_{sec}$ is calculated so that the height of the floor $H_{pla}$ is substantially equal to the height of the platform $H_q$, more particularly so that the absolute value of the distance is less than 16 mm, preferably less than 2 mm.

During the adjustment, the floor 18 is moved substantially perpendicular to the platform 11, more precisely to the surface of the platform. The floor 18 is for example moved in translation perpendicularly to said surface.

After adjustment, the entire floor 18 has a height $H_{pla}$ substantially equal to the height of the platform $H_q$. The floor 18 extends in approximately the same plane as the platform 11.

The steps for measuring of the distance D by the sensor 26, calculation of the difference and adjustment of the height of the secondary suspension are, for example, carried out at least each time the vehicle 10 enters a platform.

The measurement by the sensor 26 makes it possible to adjust the height of the floor 18 to different platform 11 heights. This in particular makes it possible to adjust the height of the floor 18 at each stop when it is provided that the vehicle makes stops at platforms having different heights.

The measurement by the sensor 26 takes account of all of the parameters inside the vehicle that may affect the height of the floor, in particular the weight carried by the car 14, the wear of the wheels, the primary suspensions and/or secondary suspensions, at the time of the measurement.

When the vehicle is at a platform, people and/or goods can enter and/or exit the car. Thus, the weight carried by the car may vary and cause a variation in the height of the floor while the vehicle is at the platform, for example, an increase or decrease in the height of the floor by a distance between 0 and 25 mm. More particularly, the variation is due on the one hand to the expansion or compression caused by at least one spring 33 of the primary suspension for a distance of between 0 and 20 mm, and on the other hand the neutral range of the pneumatic suspension for a distance of between 0 and 5 mm.

However, in case of strong influx, a person may be located in the measuring direction of the distance sensor and distort the measurement, such that it would not be possible to reiterate the control method as previously described in order to adjust the level of the floor again.

Figure 4:
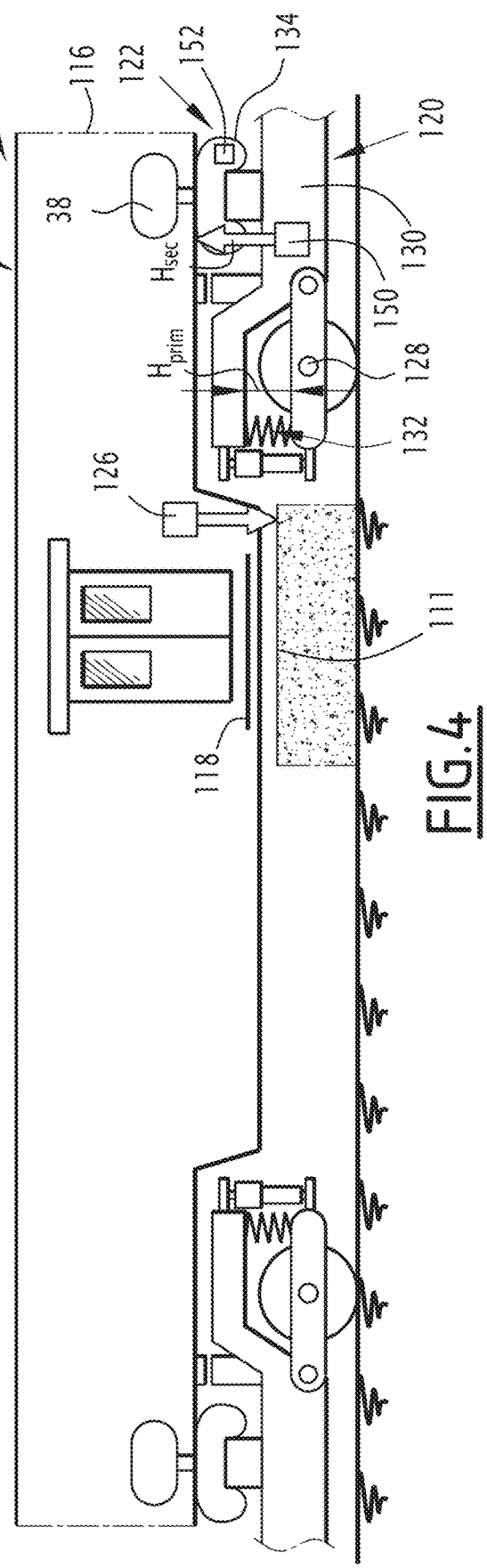
FIG. 4 is a simplified view similar to that of FIG. 2 of a car according to a second embodiment of the invention.
Figure 5:
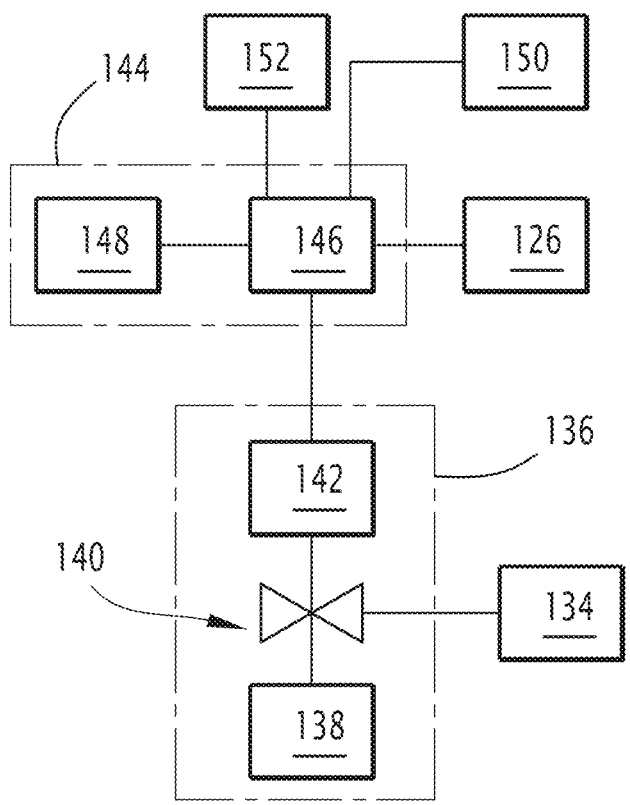
FIG. 5 is a schematic view similar to that of FIG. 3 relative to the control method according to a second embodiment of the invention.

A car 114 of a vehicle 110 according to a second embodiment of the invention is shown in FIGS. 4 and 5 and offers an improvement of the first embodiment making it possible to adjust the height while the vehicle is at a platform in case of strong influx.

The elements of the second embodiment that are similar to elements of the first embodiment are referenced hereinafter with an incrementation of 100 and are not described again hereinafter.

The vehicle 110 comprises, in addition to what was described previously, at least one additional sensor 150, 152.

More specifically here, the vehicle 110 comprises a sensor for measuring the height of the secondary suspension 150 and/or a load sensor 152 of the body.

Each additional sensor 150, 152 is able to take an additional measurement different from the measurement of the distance D between the distance sensor 126 and the platform 111.

The additional measurement here is a measurement not depending on the platform 111, more particularly it involves a measurement specific to the car 114.

The sensor 150 for measuring the height of the secondary suspension here is a sensor having a measuring direction extending substantially along the elevation direction Z. For example, it involves a laser, ultrasound or optical sensor.

As an alternative to the sensor for measuring the height of the secondary suspension 150, the vehicle 110 comprises a sensor for measuring the variation of the height of the secondary suspension.

The load sensor 152 here is a pressure sensor configured to measure the internal pressure of the cushion(s) 134. From these pressure measurements, the load sensor 152 is able to deduce a measurement of the load P exerted by the body 116 on the bogie 120.

The processor 146 is also able to receive the measurement from the additional sensors 150, 152.

The program stored in the memory 148 comprises an additional algorithm making it possible to calculate a modification of the height of the floor from additional measurements and to command an additional adjustment in order to offset the modification.

The height of the floor relative to the platform of such a vehicle 110 is able to be controlled according to a control method as described hereinafter.

The steps for measuring of the distance D by the sensor 126, calculation of the difference and adjustment of the height of the secondary suspension as described in connection with the first embodiment are carried out at least once.

The method comprises the following successive steps:
 measuring the distance D between the distance sensor 126 and the platform 111 via the distance sensor 126,
 calculating the difference between the height of the platform and the height of the floor from the distance D,
 adjusting the height of the secondary suspension, based on the calculated difference,
 additional modification of the height of the floor relative to the adjusting step,
 calculating the additional modification from additional measurements, and
 performing an additional adjustment of the height of the secondary suspension to compensate the additional modification.

The steps for measuring the distance D, calculating the difference between the height of the platform and the height of the floor and adjusting the height of the secondary suspension based on the calculated difference are similar to those that were described in light of the first embodiment.

The additional modification $\Delta H_{pla}$ is for example due to a variation in the load present in the body 116.

The variation of the load in particular causes a variation $\Delta H_{sec}$ of the height of the secondary suspension $H_{sec}$ and/or a variation $\Delta H_{prim}$ of the height of the primary suspension $H_{prim}$, the additional modification of the height of the floor being the combination of these two height variations, or $\Delta H_{pla} = \Delta H_{sec} + \Delta H_{prim}$.

The sensor for measuring the height of the secondary suspension 150 makes it possible to calculate the variation $\Delta H_{sec}$ of the height of the secondary suspension.

The load sensor 152 makes it possible to measure the load P exerted by the body 116 on the bogie 120.

The load Q on the primary suspension is equal to the sum of the load P exerted by the body 116 on the bogie 120 and the suspended mass $M_{susp}$ between the primary and secondary suspension stages. The suspended mass has a predetermined value and depends on the configuration of the bogie. One can therefore write: $Q = P + M_{susp}$. The height of the primary suspension $H_{prim}$ varies based on the load Q exerted on the primary suspension, more particularly using the relationship: $H_{prim} = H_{prim}^0 - Q/K$ with $H_{prim}^0$ a reference height of the primary suspension. The reference height of the primary suspension $H_{prim}^0$ here corresponds to the height of the primary suspension in the absence of weight inside the body 116. This reference height is for example measured during an inspection or maintenance operation.

This then yields the following relationship: $H_{prim} = H_{prim}^0 - (P + M_{susp})/K$.

The height variation of the primary suspension is therefore related to the variation of the load P exerted by the body 116 on the bogie 120 measured by the load sensor 152 owing to the following relationship: $H_{prim}=-\Delta P/K$.

The additional modification of the height of the floor can therefore be calculated with the following relationship: $\Delta H_{pla}=\Delta H_{sec}-\Delta P/K$ with $\Delta H_{sec}$ obtained owing to the additional sensor 150, $\Delta P$ obtained owing to the additional sensor 152 and K a constant parameter of the bogie.

Thus, the processor 146 calculates the additional modification from additional measurements.

Alternatively, there is only one additional measurement corresponding to a measurement of the height between the axle 128 and the body 116. Said measurement is for example done owing to a first beacon placed on the axle 128 and a second beacon placed on the body 116 in line with the first beacon along the elevation direction Z, the additional sensor measuring the distance between the two beacons.

Then, the processor 146 controls the actuating device 142 of the secondary suspension 122 in order to compensate for the additional modification.

If the additional modification is nil, the height of the secondary suspension $H_{sec}$ is kept constant.

When the additional modification corresponds to a lowering of the floor relative to the platform 111, the processor 146 controls the actuating device 142 in order to increase the height of the secondary suspension $H_{sec}$ by a given value. The given value here is equal to the absolute value of the calculated additional modification. This thus makes it possible to compensate for the additional modification. Here, the processor 146 activates the actuating device 142, which moves the solenoid valve 140 into an introduction position so as to introduce fluid into the cushion 134. The volume of the cushion 134, and thus the height of the secondary suspension $H_{sec}$, therefore the height $H_{pla}$ of the floor 118, increase.

When the additional modification corresponds to a raising of the floor relative to the platform 111, the processor 146 controls the actuating device 142 in order to decrease the height of the secondary suspension $H_{sec}$ by a given value. The given value here is equal to the absolute value of the calculated additional modification. This thus makes it possible to compensate for the additional modification. Here, the processor 46 activates the actuating device 142, which moves the solenoid valve 140 into an expulsion position so as to expel fluid from the cushion 134. The volume of the cushion 134, and thus the height of the secondary suspension $H_{sec}$, therefore the height $H_{pla}$ of the floor 118, decrease.

During the additional modification, the floor 118 is moved substantially perpendicular to the platform 111, more precisely to the surface of the platform. The floor 118 is for example moved in translation perpendicularly to said surface.

After adjustment, the entire floor 118 has a height $H_{pla}$ substantially equal to the height of the platform $H_q$. The floor 118 extends in approximately the same plane as the platform 111.

The steps for additional modification, calculation of the additional modification and additional adjustment make it possible to readjust the height of the floor 118 relative to the platform 111 without again using the distance sensor 126 capable of measuring the distance D.

More specifically, the steps for additional modification, calculation of the additional modification and additional adjustment are carried out when the distance sensor 126 capable of measuring the distance D between said sensor 126 and the platform 111 is no longer capable of measuring said distance D.

In a first variant, the steps for measuring the distance between the sensor 126 and the platform 111 via the distance sensor 126, calculating the difference between the height of the platform and the height of the floor and adjusting the height of the secondary suspension are carried out once the vehicle enters the platform, i.e., once it approaches a platform to park there. This namely makes it possible to perform an adjustment of the floor height to the height of the platform in particular. When the vehicle enters the platform, the passengers stand back from the edge of the platform for safety reasons and do not form an intermediate obstacle between the distance sensor 126 and the platform 111 in the measuring direction. Once the vehicle is stopped and passengers are authorized to enter and/or exit, passengers may prevent measurement of the distance D by the sensor 126. Thus, the steps for additional modification, calculation of the additional modification and additional adjustment are carried out when the vehicle parks at the platform. Said additional steps are for example carried out at a regular interval of between 100 milliseconds (ms) and 500 ms when the vehicle is stopped at the platform. These additional steps make it possible to continue to adjust the height of the floor based on the load variation without requiring the presence of the sensor 126, the measurement of which can be distorted.

In a second variant, the steps for measuring the distance between the sensor 126 and the platform 111 via the distance sensor 126, calculating the difference between the height of the platform and the height of the floor and adjusting the height of the secondary suspension are carried out once the vehicle enters the platform and also while the vehicle is parked when no intermediate obstacle has been detected. It is for example considered that an intermediate obstacle is detected when the distance sensor 126 records a significant variation of the distance D in a short time, which would correspond to an intermediate obstacle placed along the measuring direction or to a movement of said obstacle. A significant variation is a variation greater than 100 mm in the measurement, where variations due to a load variation are usually significantly below this value. When an intermediate obstacle is detected, the steps for additional modification, calculation of the additional modification and additional adjustment are carried out to make it possible to continue to adjust the height of the floor. Said additional steps are for example done at a regular interval of between 20 seconds to 60 seconds as long as an intermediate obstacle is detected.

A control method according to the invention, whether in the first embodiment or the second embodiment, in particular makes it possible to readjust the calculation of the difference to the outside environment measured directly owing to the distance sensor 26, 126. The adjustment made to the secondary suspension is thus as close as possible to reality, so as to minimize the height difference between the platform and the floor.

This control method accounts for the possibility of having platforms of variable heights, for example along a path passing through several stations, the wear of the vehicle and the weight carried by the vehicle, for example, at least when the vehicle enters the platform.

The second embodiment also allows an additional adjustment when the use of the distance sensor is not possible.

Thus, the control method according to the different embodiments according to the invention allows a better adjustment of the floor height relative to the platform, which in particular makes it possible to facilitate access to the vehicle.

What is claimed is:

1. A method for controlling the height of a floor of a car of a vehicle relative to a platform, the car comprising a body comprising the floor, at least one bogie and at least one secondary suspension inserted between the bogie and the body, the body being provided with a distance sensor, the sensor being able to measure a distance between said sensor and a platform when the vehicle is parked near said platform, the method comprising:
measuring the distance between the distance sensor and the platform via the distance sensor,
calculating the difference between the height of the platform and the height of the floor from the distance measured between the distance sensor and the platform, the height of the platform and the height of the floor being taken relative to a same reference point,
adjusting the height of the secondary suspension, based on the difference,
receiving a flux onto the floor of the vehicle, thereby modifying the height of the floor relative to the adjusting step with an additional modification,
calculating the additional modification from at least one additional measurement, the additional measurement being different from the measurement of the distance between the distance sensor and the platform, and
performing an additional adjustment of the height of the secondary suspension to compensate for the additional modification.

2. The control method according to claim 1, wherein, during the adjusting, the floor is moved substantially perpendicular to the platform.

3. The control method according to claim 1, wherein, after the adjusting, the entire floor has a height substantially equal to the height of the platform.

4. The control method according to claim 3, wherein, after the adjusting, the floor extends in approximately the same plane as the platform.

5. The control method according to claim 1, wherein the distance sensor is positioned to be above the platform in an elevation direction of the platform irrespective of the height of the secondary suspension.

6. The control method according to claim 5, wherein the distance sensor is a laser, ultrasound or optical sensor.

7. The control method according to claim 1, wherein the adjustment of the height of the secondary suspension is calculated so that the height of the floor is substantially equal to the height of the platform.

8. The control method according to claim 1, wherein the vehicle comprises a processor able to calculate the difference between the height of the platform and the height of the floor from the measured distance, the processor activating an actuating device of a device for controlling the height of the secondary suspension during the actuating step.

9. The control method according to claim 8, wherein the secondary suspension comprises at least one cushion and in that the device for controlling the height of the secondary suspension comprises at least one solenoid valve connected to the actuating device able to be activated by the processor, the solenoid valve being able to introduce fluid into the cushion and/or to expel fluid from the cushion.

10. The control method according to claim 1, wherein the additional measurement is done by a sensor for measuring the height of the secondary suspension or by a sensor for measuring the variation of the height of the secondary suspension or by a load sensor of the body.

11. The control method according to claim 1, wherein the steps for additional modification, calculation of the additional modification and additional adjustment are carried out when the distance sensor capable of measuring the distance between said sensor and the platform is incapable of measuring said distance.

12. The control method according to claim 1, wherein the steps for measuring the distance between the distance sensor and the platform via the distance sensor, calculating the difference between the height of the platform and the height of the floor and adjusting the height of the secondary suspension are carried out when the vehicle enters the platform and wherein the steps for additional modification, calculation of the additional modification and additional adjustment are carried out when the vehicle parks at the platform.

13. The method according to claim 1 wherein the additional measurement provides a measurement specific to the vehicle not depending on the platform.

* * * * *